United States Patent [19]
Hirschfeld

[11] 3,728,029

[45] Apr. 17, 1973

[54] ELECTRO-OPTICAL SPECTROMETER

[75] Inventor: Tomas Hirschfeld, Framingham, Mass.

[73] Assignee: Block Engineering, Inc., Cambridge, Mass.

[22] Filed: Feb. 22, 1971

[21] Appl. No.: 117,284

[52] U.S. Cl. ....................................356/83, 356/98
[51] Int. Cl. ............................................G01j 3/06
[58] Field of Search ..........................356/83, 84, 98; 178/7.2, 7.5, 7.7

[56] References Cited

UNITED STATES PATENTS

| | | | |
|---|---|---|---|
| 2,871,465 | 1/1959 | Nielsen | 356/83 X |
| 3,486,822 | 12/1969 | Harris | 356/83 |
| 3,457,416 | 7/1969 | Elliott | 356/98 UX |

OTHER PUBLICATIONS

Hardy: Patent Office Official Gazette, Vol. 625, pg. 840, August 16, 1949.

*Primary Examiner*—Ronald L. Wibert
*Assistant Examiner*—F. L. Evans
*Attorney*—Schiller & Pandiscio

[57] ABSTRACT

An electronic image-encoder with an SEC vidicon in which the electron beam is positioned according to a coordinate pair stored as digital signals and applied as analog signals to the deflection coils of the vidicon. This permits the beam to read selected points on the vidicon target and the beam is blanked until the desired deflection signals are applied.

In one version of the device, the deflection signals are simply voltages corresponding to the values of the digital signals. In another version, one digital signal is converted to an analog deflection voltage and a standard ramp is used as the other deflection voltage, the beam being turned on to read only after a time interval following initiation of the ramp, which interval is proportional to the other digital signal.

A special application of the encoder incorporates a crossed-dispersion optical system for projecting several stacked spectral orders into the vidicon target.

In all cases, the electron beam actuation provides an output signal corresponding to the image intensity at the point selected by the digital signal pair, and this output signal is digitized for storage, manipulation or display.

7 Claims, 6 Drawing Figures

TOMAS HIRSCHFELD
INVENTOR.
BY Schiller & Pandiscio
ATTORNEYS.

TOMAS HIRSCHFELD
INVENTOR.
BY *Schiller & Pandiscio*
ATTORNEYS.

ELECTRO-OPTICAL SPECTROMETER

The present invention relates to image-dissection systems and more particularly to an electronic image dissection system employing a television camera tube as an image pickup device.

A number of electronic camera tubes or photosensitive devices are known and usually function on the basis of scanning an electron beam in a repetitive pattern across successive elements of the image formed in the tube. Such scanning results in the image elements being transmitted in an orderly sequence which is then repeated. The scan can, of course, be horizontal, vertical or even spiral. To effect this scanning of the electron beam, repetitive waveforms such as saw-tooth currents, are applied to horizontal and vertical deflection plates or coils adjacent to the electron source or gun.

A relatively new type of light detector useful as a camera tube is the secondary electron conduction (SEC) vidicon. In this detector, electrons from the photocathode are highly accelerated and focused onto a nonconducting target, made of fibrous potassium chloride. The signals are amplified at the target by a second electron avalanche process. The electrons drain off through a conductive electrode plate leaving a positive charge at each point on the target proportional to the number of photons arriving at the equivalent point on the photocathode during the exposure period. This charge is trapped in the potassium chloride crystal lattice and it remains stable until readout (up to several hours). The tube can be used to integrate signals for long periods if necessary. Each resolution element thus acts as a detector, amplifier, and integrator.

Readout of the vidicon and other tubes such as the image orthicon is usually accomplished by scanning the target with an electron beam. If, however, one wishes to examine one point or element of the target, it has heretofore been necessary to go through the scan path or raster from its beginning until the beam arrives at the location of the target element in question. This, of course, introduces delay into the process of obtaining the information. If the image on the target or screen is presented as a row of columns or lines and one wishes to examine some location in a particular column, a standard scan will tend to examine not only the columns but the intercolumnar areas in which no image occurs, and the standard scanning systems are also, in this context, wasteful of time.

Also, the dynamic range of integrating imaging devices such as the image orthicon and SEC vidicon is limited to usually around 100:1 at best. Assertions of a dynamic range of 300:1 for an MgO target have been made, but not for low light levels.

The present invention has as a principal object the extension of the dynamic range of integrating imaging devices.

The present invention is also particularly intended to obviate the foregoing delay problem by providing access to predetermined locations on a target with minimized delay. Another principal object of the present invention is therefore to provide a system for controlling electron-beam readout of an electronic camera tube without resort to a repetitive two-dimensional scan. Yet other objects of the present invention are to provide a camera tube control system of the type described in which the control is digital; to provide such a digitally controlled system wherein the operation of the electron beam is accomplished by a digital computer; and to provide a system for detecting and measuring electromagnetic spectra with an electronic camera tube system; i.e., to provide a spectrometer using a television-type detector as the photosensitive pickup.

To effect these and other objects of the invention, generally readout of the target in a tube is done in a rapid stepwise fashion under control of the computer. When the beam is directed at a point on the target, there is a current pulse proportional to the positive charge at that point. Once the charge is neutralized, no further current flows. The current pulse is, therefore, the output signal from the system indicating the image intensity at the selected point on the target and can be digitized and stored in the computer. The electron beam is directed to the selected point by digital X and Y address signals provided by the computer and converted to control voltages which position the beam. In an alternative embodiment, the camera target is scanned by the beam digitally in one direction and with a continuous sweep in the orthogonal direction, the beam being triggered as it passes over the line or column or interest. In both cases, the system also preferably includes means for providing a full overscan raster pattern of a standard type for clearing the target.

To increase the dynamic range of the device, generally the electron beam is directed to read selected areas of the target which are expected to be at high illumination levels while not reading weakly illuminated areas. This permits integration buildup of the signal on the latter areas. Thus, high intensity areas are read out at once while low intensity areas are read out only when the signal has built up sufficiently to yield a relatively high signal-to-noise ratio. The "observed" contrast is thus increased by a factor equal to the number of scans used.

Other objects of the present invention will, in part, appear obvious and will, in part, appear hereinafter. The invention accordingly comprises the apparatus possessing the construction, combination of elements and arrangement of parts which are exemplified in the following detailed disclosure, and the scope of the application of which will be indicated in the claims.

For a fuller understanding of the nature and objects of the present invention, reference should be made to the following detailed description taken in connection with the accompanying drawings wherein.

Figure 1:
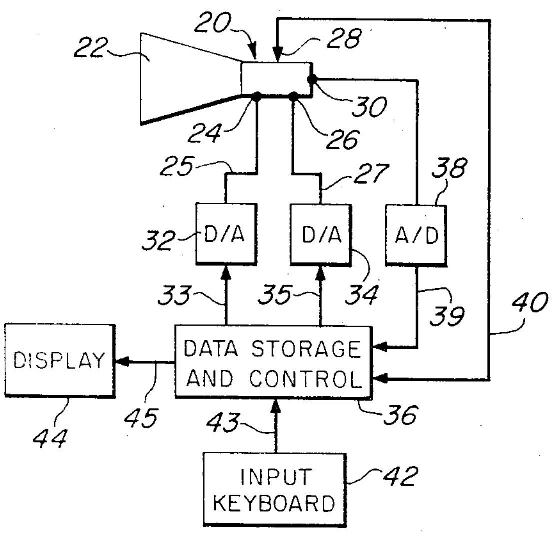
FIG. 1 is a schematic block diagram of a digitally operable camera system according to the present invention.

A system of the present invention, as shown in FIG. 1, comprises an electronic camera 20 which includes an image-forming tube such as an image orthicon, an SEC vidicon or the like. The structure and operation of such tubes, being well known in the art, need not be delineated in detail here. Suffice that such tubes read an image by the turn-on and positioning of an electron beam and that an output signal is produced corresponding to the image intensity at the point being read on the image. Hence, camera 20 includes input terminals 24 and 26 connectable respectively to the internal plates or coils of the camera tube for controlling the beam deflection in the X and Y direction across the image plane. The camera also includes other input terminal means shown generally at 28 wherein one can apply signals which control such camera functions as turn-on, turn-off, erase and the like. Lastly, camera 20 includes an output terminal 30 at which a signal may appear representative of the area or point on the target then being read by the electron beam in the tube.

Terminals 24 and 26 are connected by appropriate lines 25 and 27 to the output terminals of respective digital-to-analog converters 32 and 34. The input terminals of converters 32 and 34 are connected by lines 33 and 35 to a data storage and control means 36 which can be a general purpose digital computer, a hard-wired or special purpose digital system or the like.

Similarly, terminal 30 is connected to the input of an analog-to-digital converter 38, the output of the latter being fed into storage and control means 36 by line 39. The storage and control means also includes a general control linkage shown as 40 coupling means 36 with terminal means 28. In the preferred embodiment, there are included an input console or keyboard 42 by which one can enter new data or commands through line 43 into control means 36, and an output display 44. The latter typically is a cathode-ray device, a printer or the like by which certain information or data in the storage means 36, transferred over line 45, are made visually available.

Figure 2:
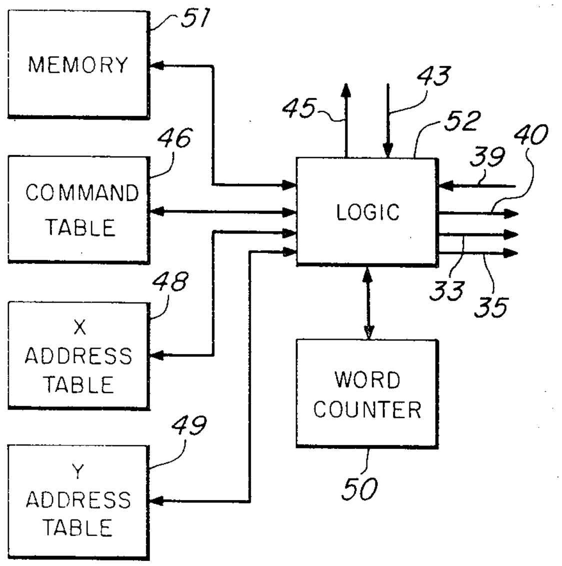
FIG. 2 is a schematic block diagram illustrating the organization of a data storage and control section of the embodiment of FIG. 1.

As shown generally in FIG. 2, the organization of storage and control means 36 is typical of a simple computer system and includes necessarily a command memory or table 46 in which various orders or commands can be stored under appropriate addresses, and address table 48 for containing all of one set of coordinates such as X coordinates, and another address table 49 for storing all the other set of coordinates, such as the Y coordinates. Additionally, storage and control means includes a word counter 50, a storage or memory means 51 and a logic section 52 organized to carry out the function shown in the sample program flow chart of FIG. 3. All of the foregoing elements being quite conventional in the art, require no further description here. Tables 46, 48 and 49 and memory means 51 are all connected to logic section 52 so that digital signals may flow in both directions between the tables and the logic section and the memory and logic section. Counter 50 is similarly coupled to logic section 52. The latter, of course, is connected to lines 33, 35, 39, 43 and 45 and linkage 40.

Figure 3:
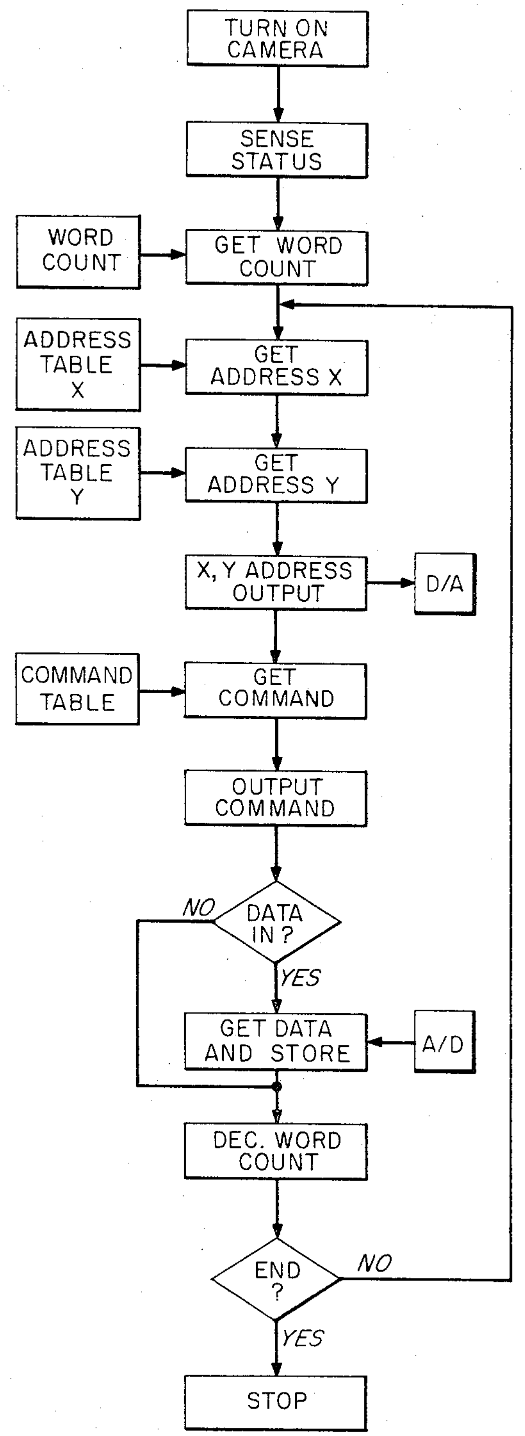
FIG. 3 is a block diagram of a flow sequence or program of operation of the system of FIG. 1.

In operation, the system functions in accordance with a program of the type shown in FIG. 3. The logic section 52 first sends out a signal over link 40, turning camera 20 on and then sends out another signal which initiates a check on the status of the camera, e.g., what elements are in working order, what elements are energized, and the like. The logic section then interrogates counter 50 to establish the work count; i.e., the total number of resolution elements that are to be examined. The first digital X coordinate is then taken from table 48 and the corresponding Y coordinate is taken from table 49. Both coordinates are converted in respective digital-to-analog converters 32 and 37 to corresponding analog voltages which, with applied to the deflection mechanism of tube 22 would position an electron beam at a specific target location. The logic section now obtains from table 46 an instruction or command with respect to the specific target location now selected. Typical commands are to "read," to "skip," to "erase," and the like. If the command is to read that target location, then, for example, the electron beam source in tube 22 is activated. The beam being previously positioned to read the specified target location, an output signal representing the integrated image intensity at that target location arises and is fed to converter 38. The latter provides the digital equivalent of the output signal, which equivalent is then transferred to memory means 51 which typically is a core memory or the like. After reading the target location, or if the command from table 46 is negative, (i.e., "skip" or do not read the target location), the logic section then proceeds to decrease the word count by one and examines the remainder after the subtraction. If the remainder is zero, indicating that no further processing is to be done, the entire sequence of events is stopped. If the remainder is some other number, then the program recycles back to get another X and Y address and proceeds to repeat the sequence of events from those points. Of course, if the command is to erase the target, the sequence of events ends upon execution of the command.

Entry of data into the address and command tables can be from keyboard 42 via line 43 through logic section 52. Similarly, display of data stored in memory means 51 can be made on display 44 via line 45 through logic section 52. The particular implementation of the logic section, tables, memory, counter, display and keyboard may be through any of a large number of known techniques. Indeed, it will be recognized by those skilled in the art that the program provided in FIG. 3 can be effected with a discrete component or "hard-wired" system, or alternatively with a general purpose computer with an appropriate program or "software."

It should be noted that, except when it is desired to read target locations or image points, the electron beam is preferably blanked or off. In this way, signals not read out are preserved in storage on the tube target and can be read out later if desired. Thus, logic section 52 can, if it is a computer, be programmed to make decisions of what image points should be read, rather than relying on a group of fixed addresses placed into tables 48 and 49 through keyboard 42. The stored image can, if this manner, be used as an extension of memory 51, since, in effect, the stored image is merely data in analog form.

Memory 51 and logic section 52 can be arranged so that input data to the former can be added to that already stored. In other words, the digital data stored in a given location in memory 51 can be recalled, summed with new data arriving over line 39 and the sum again stored in the memory. To effect the foregoing, logic section 52 could include the necessary adders well known in the art. Such a summing technique can improve the precision of reading by signal averaging and, thus, improve the signal-to-noise ratio.

This ability to read image points selectively is also very important in that it is used in one embodiment of the invention to provide a large increase in the effective dynamic range of the system. As previously noted, these devices may be considered to operate at the same time as detectors, amplifiers and integrators. The integrating capability of the detector together with the selectively read out of image points permits extension of dynamic range in the following manner:

As previously pointed out, addresses can be provided for storage in tables 48 and 49 respectively by entry through keyboard 42. However, it will be apparent that the requisite data can also be obtained by interrogations or examinations of the target area to determined what image points should be read according to some predetermined parameter. For example, the system can be instructed to complete a full raster scan and generate the coordinates of all image points or resolution elements that provide a signal below a first selected amplitude. These signals, whether self-generated or fed in through the keyboard, are recorded in memory 51, for example, in a first "low" intensity register. All points providing a signal above the first but below a second selected amplitude are recorded in memory 51 in a second "low " intensity register, and so forth until all image points have their respective coordinates stored accordingly as they are classified as to brightness. If now the image is restored to the target of the vidicon, for example, one can provide appropriate logic which will command the selective read-out of the image points according to their brightness. Thus, the strongest intensity points are read out at the highest repetition rate and the weaker points are read out less frequently. This permits the weaker points to integrate (i.e., accumulate charge) for longer periods between readings.

The arbitrary amplitude levels or step factor used to classify image point intensities are a variable, typically a software factor for the embodiment using a general purpose digital computer for data storage and control system 36. Typically, one can establish eight classes of image points resulting in a corresponding eight levels of reading frequency each differing by a factor of two. Thus, the strongest or brightest points will be read on each basic reading time count (assuming as is customary in computers that the operations are clocked), the next weaker point on every other basic reading count, the yet next weaker point on every fourth count, up to the weakest point which will be read once every 128th count.

Essentially, through the integration capability of the tube, one can thus obtain a signal from a weak image point (e.g., caused by ten photons/usec) integrated over one millisecond, which is the equivalent in amplitude to that obtained from a strong image point (e.g., caused by $1 \times 10^4$ photons/usec) taken in a one microsecond reading. The increase in dynamic range or integrating factor in this example is $10^3$ over the inherent dynamic range of the tube. Using an SEC vidicon which has an inherently high dynamic range, this selective integration and signal-averaging system will provide a dynamic range comparable to photomultipliers.

Figure 4:
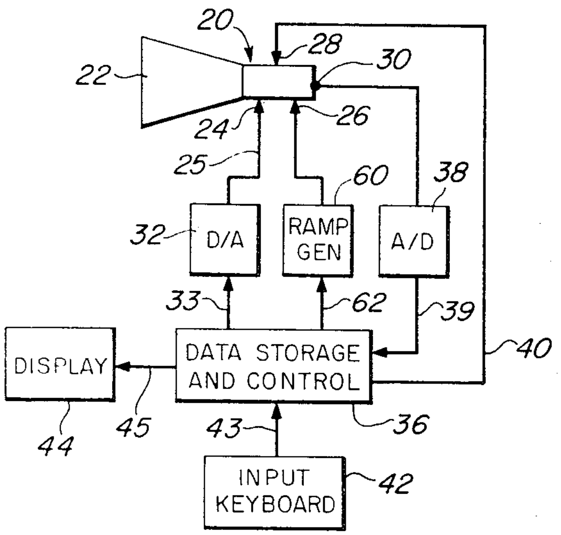
FIG. 4 is a schematic block diagram of another version of a digitally operable camera system of the present invention.

In an alternative embodiment of the invention shown in FIG. 4, the system includes all of the elements of the device of FIG. 1, except digital-to-analog converter 34 and line 35. Instead coupled to Y axis deflection control terminal 26 is the output of sweep generator 60. The input to the latter is connected by line 62 to data storage and control means 36. This embodiment is intended to operate by locating each image point in terms of a spatial coordinate (here derived from the Y address).

Figure 5:
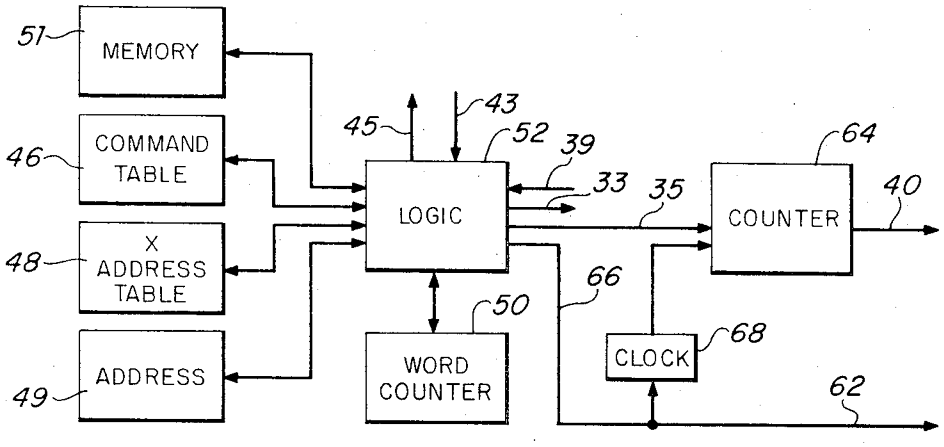
FIG. 5 is a schematic block diagram of a typical data storage and control section for the camera system of FIG. 4.

To effect the foregoing, the organization of storage and control means 36 is somewhat different as shown in FIG. 5 where the latter includes the same tables 46, 48 and 49, word counter 50 and memory 51 as in FIG. 2. With respect to these latter elements and lines 45, 43, 39 and 33, the logic section 52 is substantially the same. However, logic section 52 is here modified so that output line 35 is connected to a set of input of counter 64, and includes another output line 66 connected both to the input of clock 68 and to line 62. Logic section 52 includes means (not shown) for generating a start signal or pulse on line 66 coincident with application of the Y address data to the set input of counter 64. Clock 68 is connected to line 66 so that the start pulse on the latter starts clock 68. The output of clock 68 is connected to another or count input of counter 64. The latter is of the type which is set to a value according to the digital value of the signal on line 35 and which generates an output or completion pulse on line 40 when the count of clock pulses from clock 68 matches the value set by the signal on line 35. It will be apparent to those skilled in the art that the combination of clock, counter, logic section and Y address table are, in effect, a digital value-to-time converter.

Alternatively, the structure of storage and control means 36 and be a general purpose computer as was previously noted, programmed slightly differently than was the embodiment of FIG. 1.

The preferred program results in the following sequence of operation for the system of FIGS. 4 and 5. As in FIG. 1, the read-beam is "off" or blanked except when an image point is to be read. For each reading, the X address or coordinate is brought up by logic section 52 from the appropriate X-address table through converter 32 and used to provide a field which would deflect the reading beam to the appropriate X-axis. The Y coordinate is taken from the proper Y-address table and applied by logic section 52 to set a value in counter 64. At the same time, logic section 52 also provides a "-start" pulse, which applied to clock 68, starts the latter and causes a string of clock pulses to be applied to the count input of counter 64. The "start" pulse of line 66 is also applied through line 62 to ramp generator 60, starting the latter.

Thus, a sweep signal is applied at terminal 26 to the Y deflection coil or plate of tube 22 starting from a position on the X axis set by the signal on terminal 24. While this sweep progresses, counter 64 counts clock pulses until the sum equals the value of the Y coordinate set into the counter on line 35. This coincidence causes the counter to send out a signal on line 40 to terminal 28 turning the read-beam on momentarily to read out the image point defined by the X-axis position and the elapsed time during which the beam has been swept along the Y axis.

Alternatively, conversion of the Y address into a temporal coordinate need not involve a counter. Instead, one may simply convert the Y address to an analog signal and compare it with the value of the ramp signal applied to terminal 26. When the two signals reach a predetermined ratio (such as equivalence), a pulse can be generated to flash on the read beam. A slightly modified version can be made by digitizing the ramp voltage and comparing its digital value with the Y coordinate in a computer in order to generate the required "read" signal at the proper time. Of course, as described, the X and Y axes, as here delineated, are merely exemplary and the sweep can occur along the X axis with the Y axis coordinate being preset, or even polar coordinates can be employed.

In both versions of the camera of the invention, preferably means are included typically as part of control means 36 for providing a normal raster scan so that, if desired, the target can be read continuously as in a typical television scan. Such reading discharges the entire target and, hence, can constitute the execution of an "erase" command.

The foregoing principles are useful in constructing a spectrometric system capable of detecting and integrating all wavelengths over a reasonably wide spectral band substantially simultaneously and with wide dynamic range. Such a spectrometer preferably uses an SEC vidicon inasmuch as such devices as isocons are noisiest at low level signals and orthicons are nonlinear at low levels, whereas in vidicons the limiting noise source at low light levels is the photoelectron shot noise.

Figure 6:
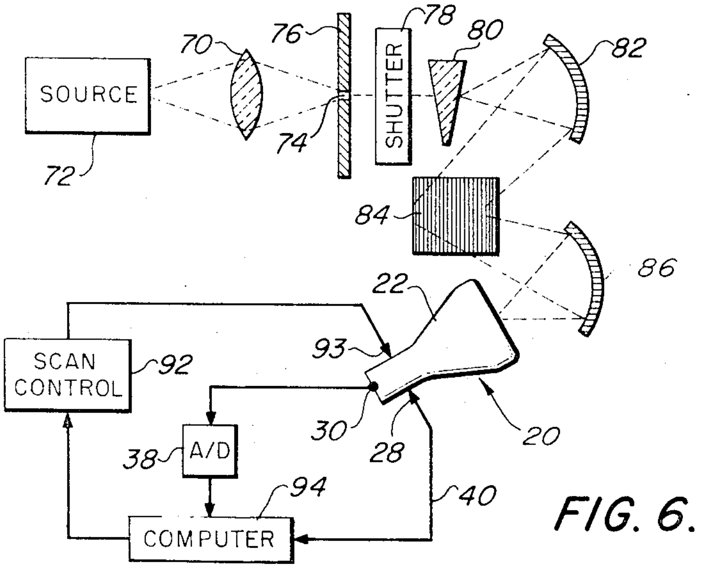
FIG. 6 is an illustration partly in block form showing a spectometric device incorporating the principles of the present invention.

Turning now to FIG. 6, there is shown a spectrometer according to the present invention and including lens 70 for focusing radiation from a spectral source 72 through slit 74 in plate 76. A shutter mechanism, shown generally at 78 is provided for controlling transmission of radiation from slit 74 onto a first optical dispersion element, such as prism 80, for dispersing radiation in a spectrum spread along a first axis. The spectrometer also includes a first mirror 82, preferably having a spherical reflecting surface, disposed for collimating and directing the spectrum provided by prism 80 onto a second optical dispersion element such as echelle 84. The latter is preferably blazed to produce a medium number of orders and to provide a resolving power between the echelon and echelette gratings. Echelle 84 is disposed so that it acts to disperse radiation from mirror 82 into a series of orders spread along a second axis perpendicular to the first or dispersion axis of prism 80. Second curved mirror 86 is provided for decollimating and focusing the array of orders from echelle 84 to a focal plane.

The optical system thus far described in connection with FIG. 6 will be recognized by those skilled in the art as an exemplary crossed-dispersion system of the type which provides a series of spectral image orders each of which is characterized in that it follows approximately the rule that $$n\lambda_o = k$$

where $\lambda_o$ is the center wavelength of each order, $n$ is the number of the order, and $k$ is a constant. Thus, for example, a spectrum which may be provided as 60 inches long by prism 80 is arranged into a stack or array of 10 6-inch spectral sections arranged one above the other, each being a different successive portion of that spectrum. The array can be arranged readily to be approximately "square" if desired.

While any of a number of different types of optical dispersion elements can be employed, it is preferred to use at least one element that disperses substantially nonlinearly so that the lateral separation between adjacent orders in the final array will be approximately the same.

At the focal plane to which mirror 86 focuses, there is disposed the target of tube 22 of camera 20 so that the spectral array is compactly arranged upon the target. For the sake of brevity, the showing of the camera and controls has been simplified in that converters 32 and 34 are simply shown as scan control 92 connected to the deflection control terminals shown as 93. The device includes A/D converter 38 having its input coupled to output terminal 30 of camera 20. Data storage and control 36, keyboard input 42 display 44 and their associated lines as shown in FIGS. 1 and 4 are simply lumped in FIG. 6 as computer 94. The latter is connected in the described manner through linkage 40 to control terminal means 28 of the camera and also to the input of scan control 92.

Now it should be noted that the spectrum displayed on the target of tube 22 is very nearly linear in wavelength and it can be expected that a given spectral line will almost exactly be at the same point on the target. Hence, to proceed from one point to another requires reasonably simple computation. If, after being examined by the computer as previously delineated (if only for calibration purposes), the array or spectral pattern has shifted on the target, the original relationship can be restored by a simple linear transformation of the origin of the coordinate system or by a rotation about the origin or both. It will be apparent from the previous discussion of the operation of the camera and associated elements that the spectrometer shown permits one readily to measure the spectral intensity of a selected number of spectral lines. This, of course, yields tremendous time savings in avoiding examination of all of the remainder of the spectrum which may be of little or no interest.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In combination with an electro-optical imaging device having means for generating an electron-beam for reading an image formed on an image surface in said device, means for controlling the lateral deflection of said electron beam, and means for providing output signals corresponding to the intensity of the image as read by said electron-beam means, a spectral analytical system comprising means for forming an image of an optical spectrum on said surface;

means for storing a plurality of pairs of digital signals, each corresponding to a pair of coordinates of a corresponding predetermined point in said image on said image surface;

means for converting predetermined pairs of said digital signals to corresponding pairs of analog-valued control signals, means for applying said control signals to said means for controlling said lateral deflection; and means for selectively activating said means for generating said beam so as to provide an output signal corresponding to each such predetermined point.

2. The combination defined in claim 1 including means for converting said output signals to corresponding digital values.

3. The combination as defined in claim 1 wherein said imaging device is an SEC vidicon.

4. The combination as defined in claim 1 wherein said means for forming said image comprises a crossed-dispersion optical system and means for projecting the crossed-dispersion image onto said image surface.

5. The combination as defined in claim 4 wherein said image surface is capable of integrating the radiation falling on each point thereof.

6. The combination as defined in claim 5 wherein at least one dispersing element of said cross-dispersion optical system disperses nonlinearly.

7. The combination as defined in claim 1 including means for activating said means for generating at a frequency for each of said points substantially inversely in relation to the intensity of radiation falling on each of said points during a unit time interval.

* * * * *